United States Patent
Ashizawa et al.

(10) Patent No.: US 12,194,999 B2
(45) Date of Patent: Jan. 14, 2025

(54) DRIVING SUPPORT METHOD AND DRIVING SUPPORT DEVICE

(71) Applicant: Nissan Motor Co., Ltd., Yokohama (JP)

(72) Inventors: Hiroyuki Ashizawa, Kanagawa (JP); Masahiro Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 200 days.

(21) Appl. No.: 18/043,154

(22) PCT Filed: Aug. 28, 2020

(86) PCT No.: PCT/JP2020/032588
§ 371 (c)(1),
(2) Date: Feb. 27, 2023

(87) PCT Pub. No.: WO2022/044253
PCT Pub. Date: Mar. 3, 2022

(65) Prior Publication Data
US 2024/0025409 A1  Jan. 25, 2024

(51) Int. Cl.
*B60W 50/10* (2012.01)
*B60W 30/14* (2006.01)
*B60W 30/17* (2020.01)
*B60W 30/18* (2012.01)

(52) U.S. Cl.
CPC .......... *B60W 30/17* (2013.01); *B60W 30/143* (2013.01); *B60W 30/18018* (2013.01); *B60W 30/18027* (2013.01); *B60W 50/10* (2013.01); *B60W 2520/105* (2013.01); *B60W 2554/80* (2020.02)

(58) Field of Classification Search
CPC ............... B60W 30/17; B60W 30/143; B60W 30/18018; B60W 30/18027; B60W 50/10; B60W 2554/80; B60W 2520/105
See application file for complete search history.

(56) References Cited

U.S. PATENT DOCUMENTS

| | | |
|---|---|---|
| 10,059,340 B2 | 8/2018 | Sugano et al. |
| 10,137,894 B2 | 11/2018 | Nakadori |
| 10,710,584 B2 | 7/2020 | Shokonji |
| 2018/0141551 A1 | 5/2018 | Sugano et al. |
| 2018/0222480 A1 | 8/2018 | Shokonji |

FOREIGN PATENT DOCUMENTS

| | | |
|---|---|---|
| JP | 2009-1106 A | 1/2009 |
| JP | 2018-127078 A | 8/2018 |
| JP | 2019-92359 A | 6/2019 |
| JP | 2020-104588 A | 7/2020 |
| WO | 2017/009940 A1 | 1/2017 |

*Primary Examiner* — Mathew Franklin Gordon
(74) *Attorney, Agent, or Firm* — Young Basile Hanlon & MacFarlane, P.C.

(57) ABSTRACT

A driving support method and a driving support device set a timing to start an own vehicle based on an elapsed time from a stop of the own vehicle to a start of a preceding vehicle existing in front of the own vehicle, wherein the timing in case that the elapsed time is long is later than the timing in case that the elapsed time is short, and start the own vehicle at the set timing by following the preceding vehicle.

4 Claims, 2 Drawing Sheets

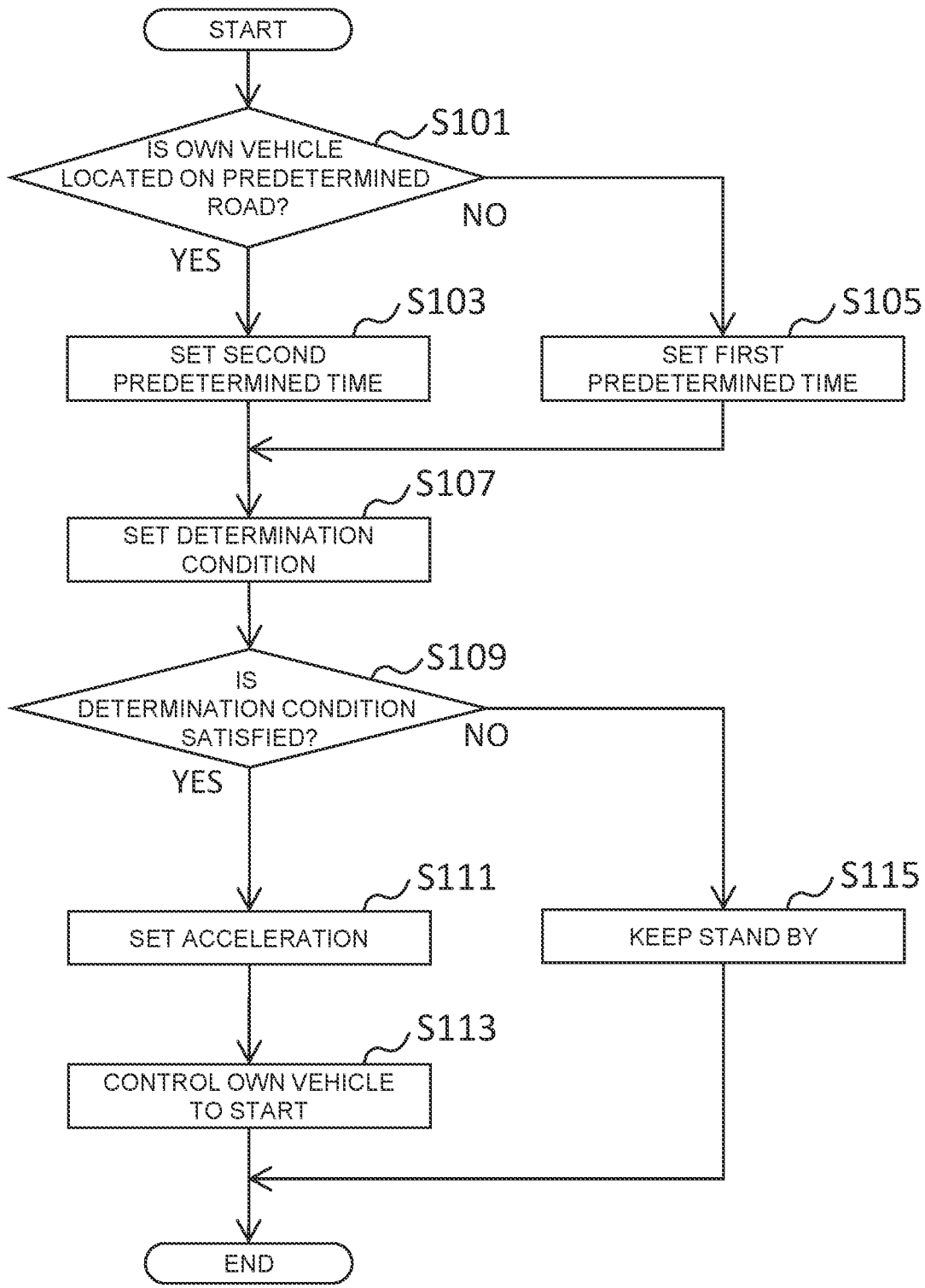

DRIVING SUPPORT METHOD AND DRIVING SUPPORT DEVICE

TECHNICAL FIELD

The present invention relates to a driving support method and a driving support device.

BACKGROUND

Conventionally, an invention has been known in which an own vehicle automatically follows a preceding vehicle (International Publication No. 2017/009940). The invention described in International Publication No. 2017/009940 detects the number of start requests input from the driver of the own vehicle when the own vehicle is stopped waiting for a signal and sets a start permission period according to the detected number of start requests.

SUMMARY

According to the invention described in International Publication No. 2017/009940, there is a possibility that the driver's attention may be reduced in a waiting period from the detection of the start request to the fulfillment of the preset start condition of the own vehicle. Therefore, when the waiting period is long, there is a possibility that the driver cannot quickly respond to the start of the own vehicle.

The present invention has been made in view of the above problems, and an object of the present invention is to provide a driving support method and a driving support device that can secure a time until the driver's attention is restored when the own vehicle is made to follow the preceding vehicle and started.

A driving support method and a driving support device, according to an aspect of the present invention, set a timing to start an own vehicle based on an elapsed time from a stop of the own vehicle to a start of a preceding vehicle existing in front of the own vehicle, wherein the timing in case that the elapsed time is long is later than the timing in case that the elapsed time is short, and start the own vehicle at the set timing by following the preceding vehicle.

According to the present invention, it is possible to secure a time until the driver's attention is restored when the own vehicle is made to follow the preceding vehicle and started.

BRIEF DESCRIPTION OF THE DRAWINGS

FIG. 2 is a flowchart illustrating a processing of the driving support device according to the embodiment of the present invention.

DETAILED DESCRIPTION

Figure 1:
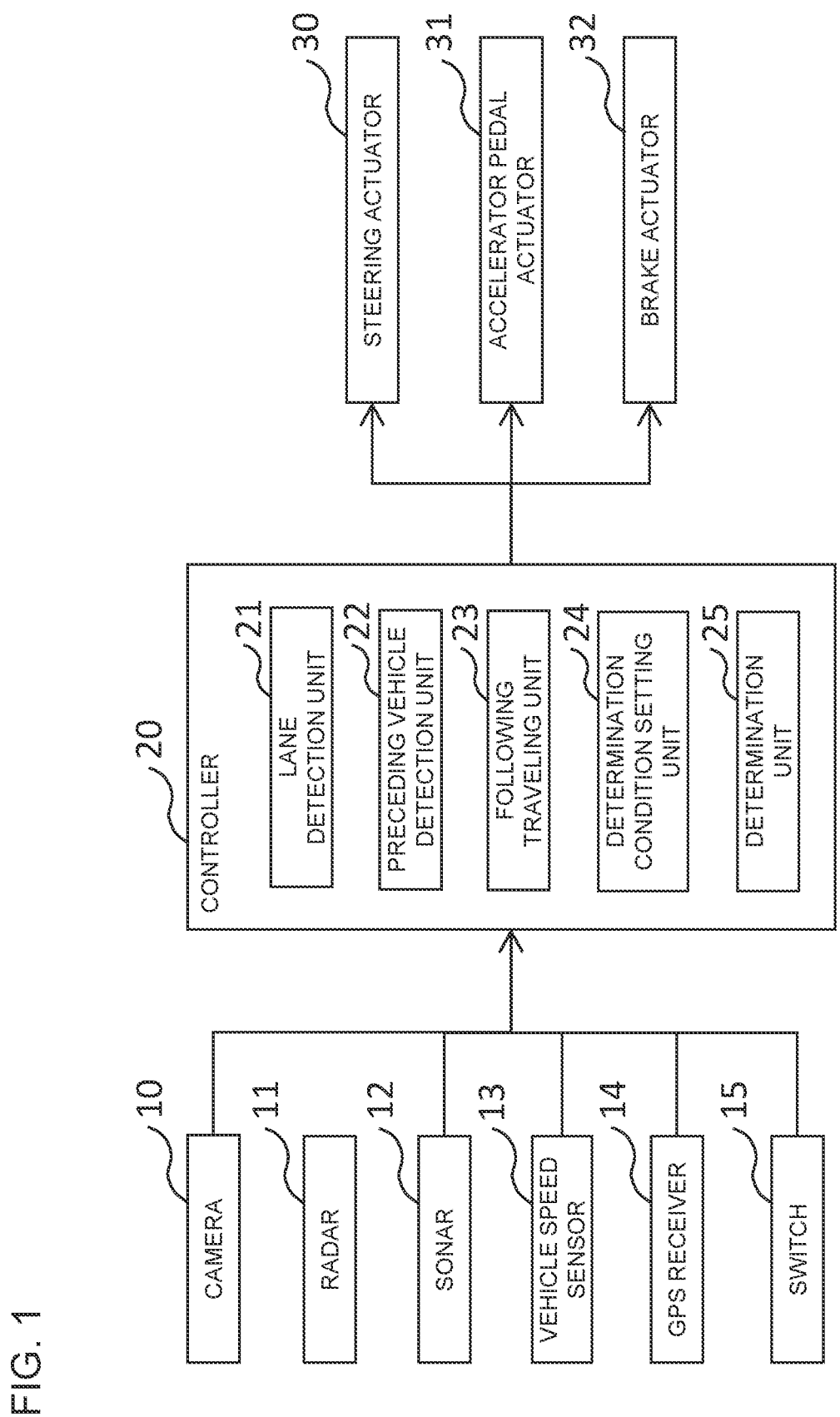
FIG. 1 is a block diagram illustrating a configuration of a driving support device according to an embodiment of the present invention.

Hereinafter, embodiments of the present invention will be described with reference to the drawings. In the description of the drawings, the same items are designated by the same reference numerals and duplicate description will be omitted.

[Configuration of driving support device] A configuration example of the driving support device 1 will be described with reference to FIG. 1. The driving support device 1 is mounted on an own vehicle having an automatic driving function.

The automatic driving function includes ACC (Adaptive Cruise Control), lane keeping, auto lane change, auto parking, and the like, but in the present embodiment, the driving support device 1 is mainly used for ACC. ACC is an automatic driving function that automatically controls acceleration/deceleration of the own vehicle up to a set speed set in advance by the user to follow the preceding vehicle. Vehicle distance control is also performed so as to maintain the distance between the vehicles according to the set speed at this time.

The follow-up control also includes a control for following the preceding vehicle after detecting the start of the preceding vehicle while the vehicle is stopped such as waiting for a signal or in a traffic jam.

As shown in FIG. 1, the driving support device 1 includes a camera 10, a radar 11, a sonar 12, a vehicle speed sensor 13, a GPS receiver 14, a switch 15, a controller 20, a steering actuator 30, an accelerator pedal actuator 31 and a brake actuator 32. In addition, the driving support device 1 may include a navigation device (not shown).

A plurality of cameras 10 are installed in the front, side, rear, side mirrors, etc. of the own vehicle. The camera 10 has an image pickup device such as a CCD (charge-coupled device) or a CMOS (complementary metal oxide semiconductor). The camera 10 detects objects existing around the own vehicle (pedestrians, bicycles, two-wheeled vehicles, other vehicles, etc.) and information around the own vehicle (lane markings, traffic lights, signs, pedestrian crossings, intersections, etc.). The camera 10 outputs the captured image to the controller 20.

A plurality of radars 11 are installed in the front, front side, rear side, etc. of the own vehicle. The radar 11 emits radio waves to an object around the own vehicle and measures the reflected wave to measure the distance and direction to the object. The radar 11 outputs the measured data to the controller 20.

The sonar 12 is installed on the front bumper or front grill. The sonar 12 emits ultrasonic waves and measures the reflected waves to measure the distance and direction to an object in the vicinity of the own vehicle (for example, about 1 to 2 m). The sonar 12 outputs the measured data to the controller 20.

The vehicle speed sensor 13 detects the speed of the own vehicle and outputs the detected speed to the controller 20.

The GPS receiver 14 detects the position information of the own vehicle on the ground by receiving the radio wave from the artificial satellite. The position information of the own vehicle detected by the GPS receiver 14 includes latitude information and longitude information. The method of detecting the position information of the own vehicle is not limited to using the GPS receiver 14. For example, the position may be estimated using a method called odometry. The odometry is a method of estimating the position of the own vehicle by acquiring the movement amount and the movement direction of the own vehicle according to the rotation angle and the rotation angular velocity of the own vehicle. The place where the GPS receiver 14 is installed is not particularly limited, but as an example, the GPS receiver 14 is installed on the instrument panel of the own vehicle. The GPS receiver 14 outputs the detected position information to the controller 20.

A plurality of switches 15 are installed on the steering wheel. The plurality of switches 15 include a switch for adjusting the set speed controlled by the ACC, a switch for setting the distance between the vehicles when the ACC is performed, and a switch for a follow-up running when the preceding vehicle starts. In the present embodiment, the switch 15 will be described as a physical switch, but the switch 15 is not limited thereto. The switch 15 may be a virtual switch. When the switch 15 is a virtual switch, the switch 15 may be displayed on the touch panel used in the navigation device.

The controller 20 is an electronic control unit (ECU) Electronic Control unit having a CPU (Central Processing Unit), a ROM (Read Only Memory), a RAM (Random Access Memory), a CAN (Controller Area Network) communication circuit, and the like.

A computer program for functioning as the driving support device 1 is installed in the controller 20. By executing the computer program, the controller 20 functions as a plurality of information processing circuits included in the driving support device 1. Here, an example is shown in which a plurality of information processing circuits included in the driving support device 1 are realized by software. However, it is also possible to configure information processing circuits by preparing dedicated hardware for executing each of the following information processing. Further, a plurality of information processing circuits may be configured by individual hardware.

The controller 20 includes a lane detection unit 21, a preceding vehicle detection unit 22 (acquisition unit), a following traveling unit 23 (travel control unit), a determination condition setting unit 24 (setting unit), and a determination unit 25 as a plurality of information processing circuits.

The lane detection unit 21 detects a lane in which the own vehicle is traveling by using the image acquired from the camera 10. Specifically, the lane detection unit 21 extracts a lane marking from the image and detects the lane in which the own vehicle travels. The lane detection unit 21 may further detect the lane in which the own vehicle is traveling by additionally using the position information of the own vehicle.

The preceding vehicle detection unit 22 (acquisition unit) detects the preceding vehicle existing in front of the own vehicle by using the image acquired from the camera 10. Further, the preceding vehicle detection unit 22 detects a distance between the own vehicle and the preceding vehicle, a relative speed of the preceding vehicle with respect to the own vehicle, and the like by using the data acquired from the radar 11. In the present embodiment, the preceding vehicle is defined as a vehicle traveling in the same lane as the own vehicle. Further, the preceding vehicle detection unit 22 acquires an elapsed time from when the own vehicle stops to when the preceding vehicle starts.

The determination unit 25 detects that the own vehicle or the preceding vehicle has started based on the detection results of the vehicle speed sensor 13 and the preceding vehicle detection unit 22. Further, the determination unit 25 acquires a type of the road on which the own vehicle travels based on the position of the own vehicle from a navigation device (not shown), and sets a "set time" according to the type of the road on which the own vehicle travels.

Here, the "set time" may be set to various values according to the type of road on which the own vehicle travels. For example, in a case that the own vehicle is traveling on a general road, a first predetermined time is set as the set time, and in a case that the own vehicle is traveling on the highway or the motorway, a second predetermined time longer than the first predetermined time may be set as the set time. For example, the first predetermined time is about 3 seconds, and the second predetermined time is about 30 seconds. In addition, the "set time" may be set based on the user's instruction.

Based on the detection result of the preceding vehicle detection unit 22, the determination unit 25 determines whether the preceding vehicle has started within the set time after the own vehicle has stopped. In addition, the determination unit 25 determines whether the "determination condition" set by the determination condition setting unit 24, which will be described later, is satisfied based on the detection result of the preceding vehicle detection unit 22.

In addition, the determination unit 25 may display, sound, and vibrate that the own vehicle or the preceding vehicle has started via an output device (for example, a display, a warning light, a speaker, a vibrator) (not shown) to notify the user.

The determination condition setting unit 24 (setting unit) sets "determination condition" for determining that the own vehicle can start based on the elapsed time from when the own vehicle stops to when the preceding vehicle starts. Since it can be determined that the own vehicle can be started at the timing when it is determined that the determination condition is satisfied, the timing at which the determination condition is satisfied and the timing at which the own vehicle is started can be substantially equated. Therefore, in the following, the timing at which the determination condition is satisfied and the timing at which the own vehicle is started will be described without particular distinction.

According to the determination condition set by the determination condition setting unit 24, the timing to start the own vehicle in case that the elapsed time is long is set later than the timing to start the own vehicle in case that the elapsed time is short. The determination condition setting unit 24 may set the timing for starting the own vehicle based on the determination condition, or may set the timing itself for starting the own vehicle.

Further, the determination condition setting unit 24 may set a condition: "the distance between the preceding vehicle and the own vehicle is equal to or greater than the predetermined distance" as the determination condition. Here, the determination condition setting unit 24 sets the predetermined distance based on the elapsed time. For example, the determination condition setting unit 24 may set the predetermined distance longer in a case that the elapsed time is longer than the predetermined distance set in a case that the elapsed time is short. The determination condition setting unit 24 may set the predetermined distance longer as the elapsed time increases.

According to the determination condition set in this way, after the preceding vehicle starts, the starting of the own vehicle is restricted until the distance between the preceding vehicle and the own vehicle gradually increases and reaches the predetermined distance. Therefore, the timing to start the own vehicle in case that the elapsed time is long is set later than the timing to start the own vehicle in case that the elapsed time is short.

Further, the determination condition setting unit 24 may set a condition: "the speed of the preceding vehicle is equal to or higher than the predetermined speed" as the determination condition. Here, the determination condition setting unit 24 sets the predetermined speed based on the elapsed time. For example, the determination condition setting unit 24 may set the predetermined speed higher in a case that the elapsed time is longer than the predetermined speed set in a case that the elapsed time is short. The determination condition setting unit 24 may set the predetermined speed higher as the elapsed time becomes longer.

According to the determination conditions set in this way, after the preceding vehicle starts, the starting of the own vehicle is restricted until the vehicle speed of the preceding vehicle gradually increases to the predetermined speed or higher. Therefore, the timing to start the own vehicle in case that the elapsed time is long is set later than the timing to start the own vehicle in case that the elapsed time is short.

The following traveling unit 23 (travel control unit) performs a follow-up running control to control the own vehicle so that the own vehicle automatically follows the preceding vehicle and travels. Specifically, when the user turns on the switch for starting the ACC, the following traveling unit 23 controls the steering actuator 30, the accelerator pedal actuator 31, and the brake actuator 32, and makes the own vehicle follow the preceding vehicle with a speed set in advance by the user as an upper limit. At this time, the following traveling unit 23 also performs inter-vehicle distance control so as to maintain the distance between the preceding vehicle and the own vehicle, according to the set speed. The user can also specify the distance between the preceding vehicle and the own vehicle.

If the preceding vehicle is not detected when the user turns on the switch for starting the ACC, the following traveling unit 23 causes the own vehicle to travel at a constant speed at the set speed. If the speed is not set, the following traveling unit 23 may automatically drive the own vehicle up to the legal speed of the road on which the own vehicle is currently traveling.

The following traveling unit 23 may set a rate of change in acceleration when the own vehicle starts, based on the elapsed time. More specifically, the following traveling unit 23 may set the rate of change in acceleration of the own vehicle in case that the elapsed time is long smaller than the rate of change in acceleration of the own vehicle in case that the elapsed time is short. Further, the following traveling unit 23 may set the acceleration at the time of starting of the own vehicle so that the rate of change of the acceleration at the time of starting of the own vehicle becomes smaller as the elapsed time becomes longer. That is, the longer the set time is, the more slowly the own vehicle controlled by the following traveling unit 23 starts accelerating.

Based on the determination result of the determination unit 25, the following traveling unit 23 may perform the follow-up running control described above in a case that the determination condition set by the determination condition setting unit 24 is satisfied after the preceding vehicle starts within the set time after the own vehicle stops. On the other hand, the following traveling unit 23 may keep the own vehicle stand by while the vehicle is parked in a case that the preceding vehicle does not start within the set time after the own vehicle has stopped or in a case that the determination condition is not satisfied.

[Processing Procedure of the Driving Support Device]

Next, the processing procedure of the driving support device according to the present embodiment will be described with reference to the flowchart of FIG. 2. The process of the driving support device shown in FIG. 2 may be repeatedly executed at a predetermined cycle.

In step S101, the determination unit 25 determines whether the own vehicle is located on the predetermined road (for example, a highway or a motorway).

Ina case that it is determined that the own vehicle is not located on the predetermined road (NO in step S101), the determination unit 25 sets the first predetermined time as the set time in step S105.

On the other hand, in a case that it is determined that the own vehicle is located on the predetermined road (YES in step S101), the determination unit 25 sets the second predetermined time as the set time in step S103.

In step S107, the determination condition setting unit 24 sets "determination condition" for determining that the own vehicle can start.

In step S109, the determination unit 25 determines whether the determination condition set by the determination condition setting unit 24 is satisfied.

In a case that it is determined that the determination condition is not satisfied (NO in step S109), in step S115, the following traveling unit 23 keeps the own vehicle stand by while being stopped.

On the other hand, in a case that it is determined that the determination condition is satisfied (YES in step S109), the following traveling unit 23 sets the acceleration at the time of starting of the own vehicle in step S111. Then, in step S113, the following traveling unit 23 controls the own vehicle so that the own vehicle starts at the set acceleration.

Effect of Embodiments

As explained in detail above, a driving support method and a driving support device according to the present embodiment, when starting an own vehicle by following a preceding vehicle existing in front of the own vehicle, acquire an elapsed time from a stop of the own vehicle to a start of the preceding vehicle, set a timing to start the own vehicle based on the elapsed time, wherein the timing in case that the elapsed time is long is later than the timing in case that the elapsed time is short, and start the own vehicle at the timing.

As a result, it is possible to secure a time until the driver's attention is restored when the own vehicle is made to follow the preceding vehicle and started. Further, in a case that the elapsed time is long, it is determined that the own vehicle can start at a later timing, and the own vehicle starts at a timing when the preceding vehicle moves farther from the own vehicle. As a result, the discomfort felt by the user can be reduced.

In addition, after the own vehicle has stopped, it is possible to realize a flexible start of the own vehicle as the preceding vehicle starts. For example, if the elapsed time is long, it is determined that the own vehicle can start at a later timing. Thus, it is possible to secure the time until the system of the own vehicle (including engine, navigation, and other vehicle control systems, etc.) is started before the timing of the start of the own vehicle. As a result, it is possible to reduce the load on the system of the own vehicle that may occur at the time of starting of the system.

If the elapsed time is short, it is determined that the own vehicle can start at an early timing, but in this case, it can be determined that it is not necessary to stop the system of the own vehicle. Therefore, it is possible to avoid unnecessary stoppage of the system and reduce the load on the system of the own vehicle.

Restoration of the driver's attention is described. In a case that the elapsed time is long, the time from when the own vehicle stops to when the vehicle starts again becomes long, and a situation may occur in which the user's attention may be reduced. In such a situation, the distance between the own vehicle and the preceding vehicle at the time of starting the own vehicle becomes long. Thus, it is possible to secure the time necessary for the user's attention to recover while the own vehicle starts and the own vehicle approaches the preceding vehicle. As a result, the user can start the operation with a margin. In addition, the user can stay in the vehicle with a margin while the own vehicle is controlled to follow the preceding vehicle.

Here, "the user can start the operation with a margin" means that that the user has time to pay attention to the driving operation by recovering his/her attention and by grasping the steering wheel of the own vehicle. Further, "the user can stay in the vehicle with a margin" means that the user has time to take an appropriate posture according to the running of the own vehicle.

In a case that the elapsed time is short, it is determined that the own vehicle can start at an early timing, and thus, the time from when the own vehicle stops to when it starts again becomes shorter. Therefore, it is possible to secure the followability of the own vehicle to the start of the preceding vehicle.

Further, the driving support method and the driving support device according to the present embodiment may set a predetermined distance based on the elapsed time, wherein the predetermined distance in case that the elapsed time is long is longer than the predetermined distance in case that the elapsed time is short, and may start the own vehicle in a case that distance between the preceding vehicle and the own vehicle becomes the predetermined distance or greater.

Thus, in a case that the elapsed time is long, it is possible to secure a long distance between the own vehicle and the preceding vehicle when the own vehicle starts. As a result, even in a situation where the user's attention may be reduced, it is possible to secure the time required for the user's attention to recover while the own vehicle starts and the own vehicle approaches the preceding vehicle.

Further, in a case that the elapsed time is short, the distance between the own vehicle and the preceding vehicle at the time of starting the own vehicle becomes short, so that it is possible to secure the followability of the own vehicle to the start of the preceding vehicle.

Further, the driving support method and the driving support device according to the present embodiment may set a predetermined speed based on the elapsed time, wherein the predetermined speed in case that the elapsed time is long is higher than the predetermined speed in case that the elapsed time is short, and may start the own vehicle in a case that a speed of the preceding vehicle becomes equal to or higher than the predetermined speed.

Thus, in a case that the elapsed time is long, the relative speed between the own vehicle and the preceding vehicle can be increased. As a result, even in a situation where the user's attention may be reduced, it is possible to secure the time required for the user's attention to recover while the own vehicle starts and the own vehicle approaches the preceding vehicle.

Further, in a case that the elapsed time is short, the relative speed between the own vehicle and the preceding vehicle becomes small, so that it is possible to secure the followability of the own vehicle to the start of the preceding vehicle.

Further, in the driving support method and the driving support device according to the present embodiment, a rate of change in acceleration of the own vehicle in case that the elapsed time is long may be set smaller than a rate of change in acceleration of the own vehicle in case that the elapsed time is short. As a result, in a case that the elapsed time is long, the acceleration at the time of starting the own vehicle gradually increases. Therefore, even in a situation where the time becomes long from when the own vehicle stops to when the own vehicle starts again and the user's attention may be reduced, it is possible to secure the time required for your attention to recover while the own vehicle starts and approaches the preceding vehicle. As a result, the user can start the operation with a margin.

Further, the driving support method and the driving support device according to the present embodiment may determine whether or not the own vehicle is located on the predetermined road, may set a first predetermined time as a set time in case of determining that the own vehicle is not located on the predetermined road, may set a second predetermined time longer than the first predetermined time as the set time in a case of determining that the own vehicle is located on the predetermined road, and may start the own vehicle in a case that the preceding vehicle starts within the set time after the own vehicle has stopped. In particular, the predetermined road may be a highway or a motorway. As a result, the set time can be set longer on the predetermined road where the frequency of crossing of such as a pedestrian or a bicycle is low, and the number of times the user operates the own vehicle can be reduced.

On the other hand, on roads where the frequency of crossing of such as a pedestrian or a bicycle is high, the set time is set short, and the inter-vehicle distance between the own vehicle and the preceding vehicle can be reduced. As a result, the possibility that a pedestrian, a bicycle, or the like passes between the own vehicle and the preceding vehicle can be reduced, and factors that hinder the followability of the own vehicle to the preceding vehicle can be reduced.

Respective functions described in the above embodiment may be implemented by one or plural processing circuits. The processing circuits include programmed processors, electrical circuits, etc., as well as devices such as application specific integrated circuits (ASIC) and circuit components arranged to perform the described functions, etc.

Although the contents of the present invention have been described above with reference to the embodiment, the present invention is not limited to these descriptions, and it will be apparent to those skilled in the art that various modifications and improvements can be made. It should not be construed that the present invention is limited to the descriptions and the drawings that constitute a part of the present disclosure. On the basis of the present disclosure, various alternative embodiments, practical examples, and operating techniques will be apparent to those skilled in the art.

It is needless to mention that the present invention also includes various embodiments that are not described herein. Therefore, the technical scope of the present invention is to be defined only by the invention specifying matters according to the scope of claims appropriately obtained from the above descriptions.

REFERENCE SIGNS LIST 1 driving support device
10 camera
11 radar
12 sonar
13 vehicle speed sensor
14 GPS receiver
15 switch
20 controller
21 lane detection unit
22 preceding vehicle detection unit (acquisition unit)
23 following traveling unit (travel control unit)
24 determination condition setting unit (setting unit)
25 determination unit
30 steering actuator
31 accelerator pedal actuator
32 brake actuator

The invention claimed is:

1. A driving support method for controlling a controller to start an own vehicle by following a preceding vehicle existing in front of the own vehicle, the method comprising:
   acquiring an elapsed time from a stop of the own vehicle or a detection of a start request of the own vehicle to a start of the preceding vehicle;
   setting a timing to start the own vehicle based on the elapsed time, wherein the timing in case that the elapsed time is long is later than the timing in case that the elapsed time is short; and
   starting the own vehicle at the timing, wherein a rate of change in acceleration of the own vehicle in case that the elapsed time is long is set smaller than a rate of change in acceleration of the own vehicle in case that the elapsed time is short.

2. The driving support method according to claim 1, further comprising:
   setting a predetermined distance based on the elapsed time, wherein the predetermined distance in case that the elapsed time is long is longer than the predetermined distance in case that the elapsed time is short; and
   starting the own vehicle in a case that distance between the preceding vehicle and the own vehicle becomes the predetermined distance or greater.

3. The driving support method according to claim 1, further comprising:
   setting a predetermined speed based on the elapsed time, wherein the predetermined speed in case that the elapsed time is long is higher than the predetermined speed in case that the elapsed time is short; and
   starting the own vehicle in a case that a speed of the preceding vehicle becomes equal to or higher than the predetermined speed.

4. A driving support device comprising a controller to drive an own vehicle by following a preceding vehicle existing in front of the own vehicle, wherein the controller is configured to:
   acquire an elapsed time from a stop of the own vehicle or a detection of a start request of the own vehicle to a start of the preceding vehicle;
   set a timing to start the own vehicle based on the elapsed time, wherein the timing in case that the elapsed time is long is later than the timing in case that the elapsed time is short; and
   start the own vehicle at the timing, wherein a rate of change in acceleration of the own vehicle in case that the elapsed time is long is set smaller than a rate of change in acceleration of the own vehicle in case that the elapsed time is short.

* * * * *